United States Patent
Fagan

(10) Patent No.: US 12,113,695 B2
(45) Date of Patent: *Oct. 8, 2024

(54) SYSTEMS AND METHODS FOR AUTOMATED REMOTE NETWORK PERFORMANCE MONITORING

(71) Applicant: Verizon Patent and Licensing Inc., Basking Ridge, NJ (US)

(72) Inventor: Scott Fagan, Red Wing, MN (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/147,831

(22) Filed: Dec. 29, 2022

(65) Prior Publication Data

US 2023/0135322 A1 May 4, 2023

Related U.S. Application Data

(63) Continuation of application No. 17/101,882, filed on Nov. 23, 2020, now Pat. No. 11,552,872.

(51) Int. Cl.
*H04W 24/02* (2009.01)
*H04L 43/028* (2022.01)
*H04L 43/08* (2022.01)
*H04L 43/12* (2022.01)
*H04L 47/70* (2022.01)
*H04W 74/0833* (2024.01)

(52) U.S. Cl.
CPC ............ *H04L 43/12* (2013.01); *H04L 43/028* (2013.01); *H04L 43/08* (2013.01); *H04L 47/827* (2013.01); *H04W 74/0833* (2013.01)

(58) Field of Classification Search
CPC ....... H04L 43/12; H04L 43/028; H04L 43/08; H04L 47/827; H04L 41/0213; H04L 43/022; H04L 43/062; H04L 43/20; H04W 74/0833; H04W 24/10; H04W 24/02
USPC ......................................................... 370/252
See application file for complete search history.

(56) References Cited

U.S. PATENT DOCUMENTS

| | | | |
|---|---|---|---|
| 6,374,352 B1* | 4/2002 | Goldman | G06F 9/4411 714/E11.134 |
| 8,547,855 B1* | 10/2013 | Zingale | H04L 41/14 709/224 |
| 10,243,657 B1 | 3/2019 | Atlas | |
| 10,572,879 B1 | 2/2020 | Hunter et al. | |
| 10,693,751 B2 | 6/2020 | Alshafei et al. | |
| 10,785,791 B1 | 9/2020 | Eyuboglu | |

(Continued)

*Primary Examiner* — Thuong Nguyen

(57) ABSTRACT

In some implementations, a device may determine one or more parameters for filtering network traffic of a network that includes a plurality of virtual packet brokers provided for a plurality of cloud random access networks and a plurality of traffic aggregation points. The device may provide the one or more parameters to the plurality of virtual packet brokers, to cause the plurality of virtual packet brokers to filter the network traffic to obtain network visibility traffic. The device may receive, from one or more probes of a session aggregation point of the network, one or more metrics calculated based on the network visibility traffic by the plurality of virtual packet brokers. The device may determine one or more actions to be implemented based on the one or more metrics. The device may cause the one or more actions to be implemented in the network.

20 Claims, 9 Drawing Sheets

(56) References Cited

U.S. PATENT DOCUMENTS

| | | | |
|---|---|---|---|
| 11,552,872 B2* | 1/2023 | Fagan | H04L 43/12 |
| 2003/0174689 A1 | 9/2003 | Fujino | |
| 2003/0177048 A1* | 9/2003 | Jacobson | G06Q 30/02 |
| | | | 705/7.41 |
| 2004/0208892 A1* | 10/2004 | Evans | A61K 51/1296 |
| | | | 424/195.17 |
| 2007/0076746 A1 | 4/2007 | Faska et al. | |
| 2007/0192344 A1 | 8/2007 | Meier et al. | |
| 2008/0080475 A1* | 4/2008 | Orth | H04L 47/26 |
| | | | 370/350 |
| 2008/0162839 A1* | 7/2008 | Nakamichi | G06F 3/0665 |
| | | | 711/159 |
| 2009/0064109 A1* | 3/2009 | Mitran | G06F 11/3612 |
| | | | 717/124 |
| 2009/0287734 A1* | 11/2009 | Borders | H04L 67/02 |
| | | | 709/224 |
| 2010/0050241 A1 | 2/2010 | Yan et al. | |
| 2011/0107329 A1* | 5/2011 | Betzler | G06F 9/455 |
| | | | 718/1 |
| 2011/0131645 A1 | 6/2011 | Johnson et al. | |
| 2011/0295925 A1 | 12/2011 | Lieblich et al. | |
| 2012/0259950 A1* | 10/2012 | Havekes | H04L 65/612 |
| | | | 709/217 |
| 2013/0311641 A1* | 11/2013 | Chow | G08G 1/04 |
| | | | 709/224 |
| 2014/0188434 A1* | 7/2014 | Steinbrecher | G05B 23/0283 |
| | | | 702/184 |
| 2014/0195694 A1* | 7/2014 | Sait | H04L 45/18 |
| | | | 709/239 |
| 2014/0280182 A1* | 9/2014 | Anderson | G06F 11/3495 |
| | | | 707/741 |
| 2015/0016249 A1* | 1/2015 | Mukundan | H04L 12/66 |
| | | | 370/230 |
| 2016/0110211 A1* | 4/2016 | Karnes | G06F 9/45558 |
| | | | 718/1 |
| 2016/0316485 A1* | 10/2016 | Kumar | H04W 24/08 |
| 2017/0054648 A1* | 2/2017 | Ngo-Tan | H04L 65/752 |
| 2017/0149665 A1 | 5/2017 | Yousaf et al. | |
| 2017/0230211 A1 | 8/2017 | Teflian | |
| 2017/0244648 A1 | 8/2017 | Tse | |
| 2017/0339022 A1 | 11/2017 | Hegde et al. | |
| 2018/0082066 A1* | 3/2018 | Munjal | G06F 21/6209 |
| 2018/0109819 A1* | 4/2018 | Lu | H04N 21/2387 |
| 2018/0132227 A1 | 5/2018 | Ghosh et al. | |
| 2018/0234882 A1 | 8/2018 | Cho et al. | |
| 2018/0331912 A1* | 11/2018 | Edmison | H04L 43/062 |
| 2019/0058725 A1 | 2/2019 | Kraning et al. | |
| 2019/0089617 A1* | 3/2019 | Raney | H04L 43/12 |
| 2020/0037354 A1* | 1/2020 | Li | H04W 74/0808 |
| 2020/0145337 A1 | 5/2020 | Keating et al. | |
| 2020/0374751 A1* | 11/2020 | Krishnaswamy | H04L 1/08 |
| 2020/0382396 A1 | 12/2020 | Scott et al. | |
| 2020/0389386 A1 | 12/2020 | Uscumlic et al. | |
| 2020/0396301 A1 | 12/2020 | Abhigyan et al. | |
| 2021/0144050 A1 | 5/2021 | Fagan | |
| 2021/0226647 A1 | 7/2021 | Richart et al. | |

* cited by examiner

SYSTEMS AND METHODS FOR AUTOMATED REMOTE NETWORK PERFORMANCE MONITORING

RELATED APPLICATION

This application is a continuation of U.S. patent application Ser. No. 17/101,882, entitled "SYSTEMS AND METHODS FOR AUTOMATED REMOTE NETWORK PERFORMANCE MONITORING," filed Nov. 23, 2020 (now U.S. Pat. No. 11,552,872), which is incorporated herein by reference in its entirety.

BACKGROUND

Multi-access edge computing (MEC) devices are provided for monitoring cloud RANs (CRANs) and traffic aggregation points (TAPs) in networks. A CRAN may be a cloud-native software solution for handling RAN functionality. CRANs enable greater flexibility and versatility to both large-scale and centralized 5G network deployments.

DETAILED DESCRIPTION OF PREFERRED EMBODIMENTS

Figure 1A:
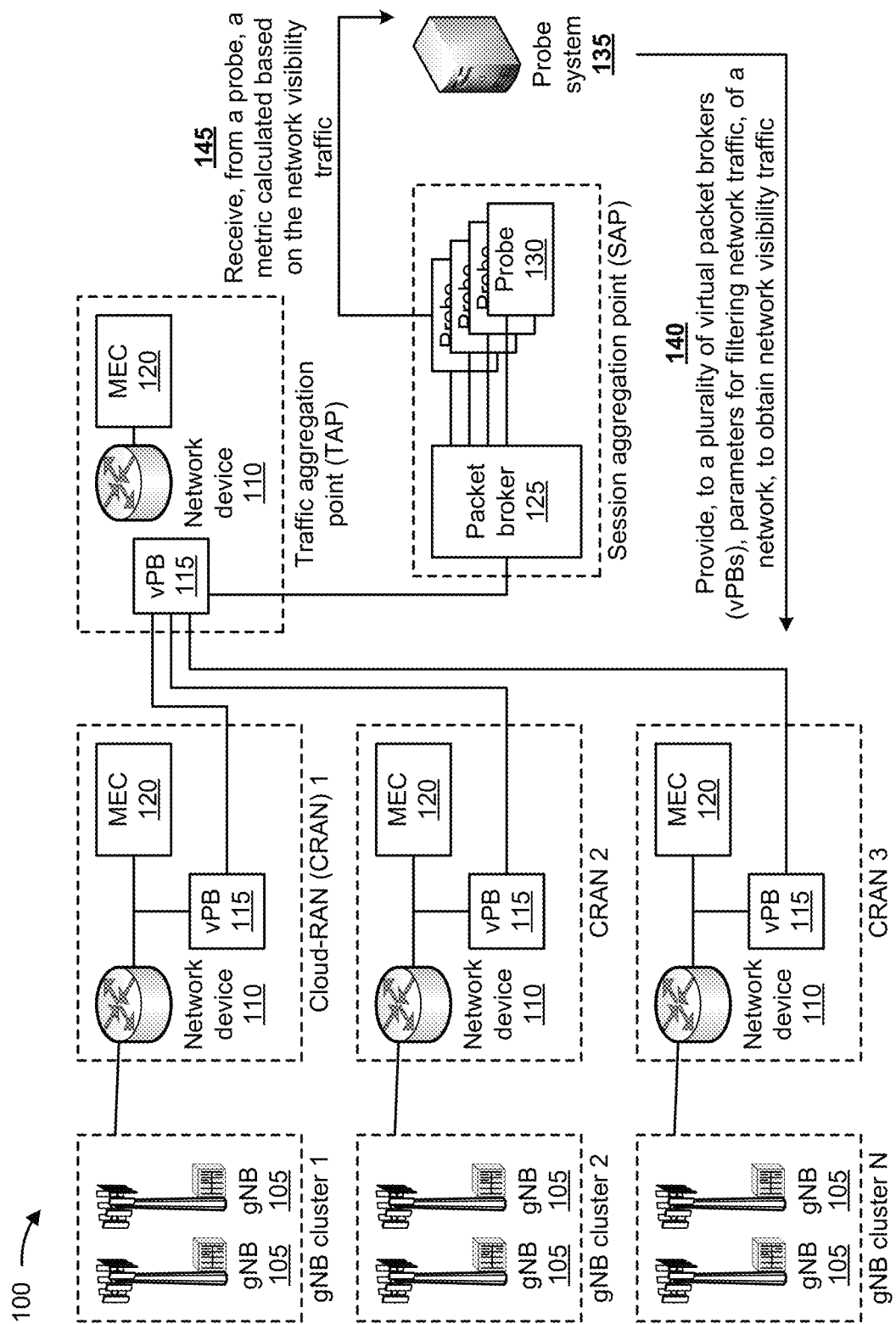
FIGS. 1A-1F are diagrams of an example associated with automated remote network performance monitoring.
Figure 1B:
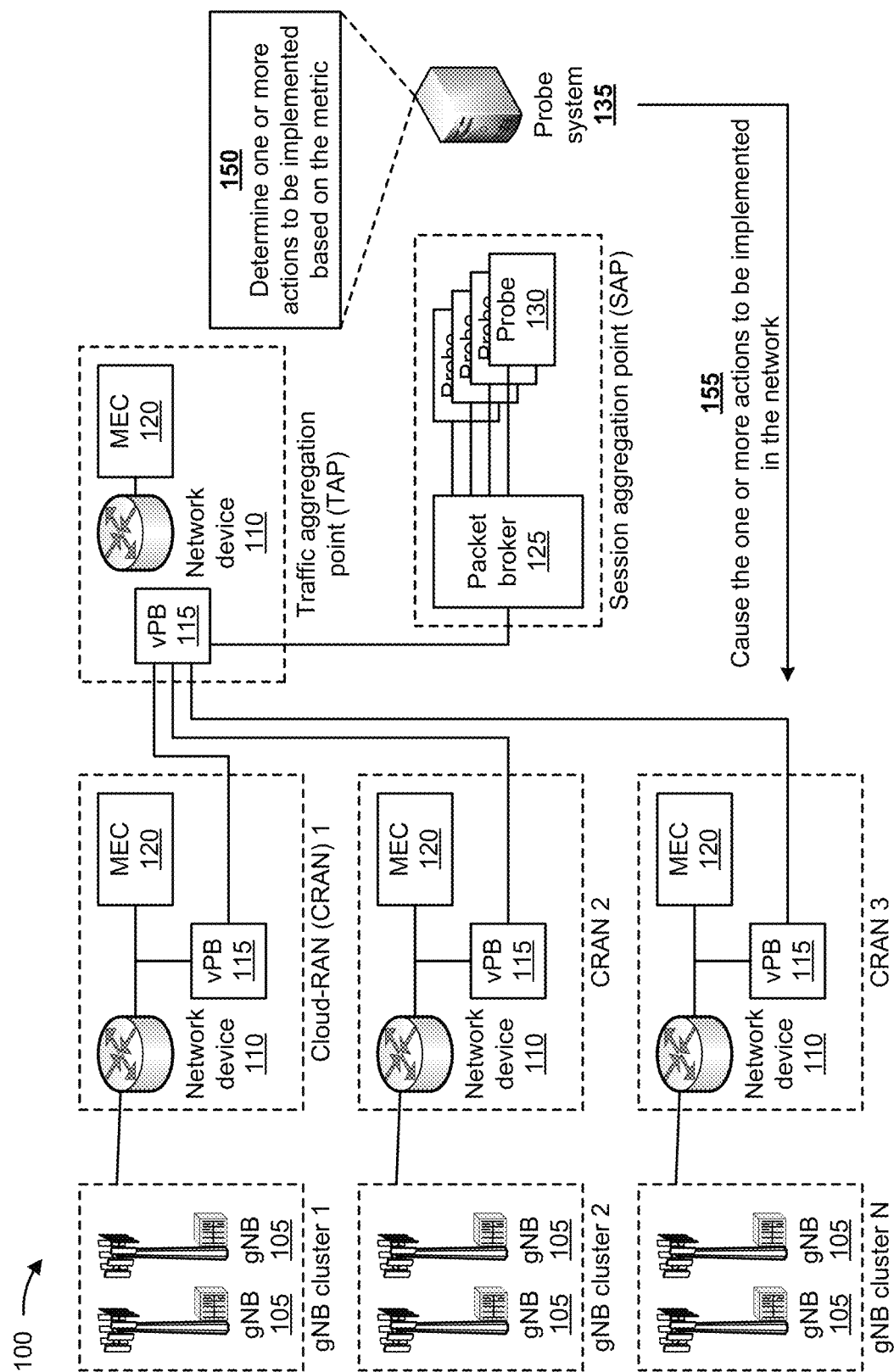

The following detailed description of example implementations refers to the accompanying drawings. The same reference numbers in different drawings may identify the same or similar elements.

In some instances, a user device may request access, via a network node, to a service provided via multi-access edge computing (MEC). The network node may be associated with a wireless network that provides access to MEC. The network node may facilitate a connection between the user device and a MEC node based on a geographical location of the user device and/or the MEC node. For example, the network node may receive the request including a domain name and convert the domain name into a network address (e.g., an internet protocol (IP) address) of the MEC node that is geographically closest to the user device.

MEC devices are provided for cloud radio access networks (CRANs) and traffic aggregation points (TAPs) in a network. The TAPs may involve clusters of base stations for aggregating traffic. A TAP may aggregate multiple CRANs. A probe system may use probes to monitor performance indicators and customer performance issues at CRANs and TAPs. The probes may perform key performance indicator (KPI) calculations and store related packets. However, the quantity of CRANs and TAPs in a network may be large, and the cost of installing probes at all of the CRANs and TAPs may be too expensive. A session aggregation point (SAP) of the network may include a stack of probes, and may not be able to monitor traffic at all of the CRANs or TAPs. Without the functionality of such probes monitoring the CRANs and the TAPs, the network may suffer performance issues that contribute to wasted time, power, processing resources, and signaling resources.

In some implementations, a probe system may deploy virtual packet brokers (vPBs) on commercial off-the-self (COTS) hardware in CRANs and TAPs to enable network traffic filtering. Traffic may be filtered based on virtual internet protocol (VIP) addresses, subnets, or tuples. The vPBs may be lightweight and inexpensive. The vPBs may have no storage, are more passive, and may not calculate key performance indicators (KPIs). The vPBs may be COTS vPBs. The vPBs may be software executing on COTS hardware or on a COTS packet broker. The vPBs may also be virtual PBs executing on a server. A TAP may be part of a visibility system, where traffic that is observed and copied remotely can be passed as visibility traffic. The vPBs in the CRANs and TAPs may pass visibility traffic that is of interest on demand or according to an automated schedule to a SAP where probes are aggregated. The vPBs may enable full-time simple network management protocol (SNMP) polling of some or all visibility traffic, including tenant traffic separation to determine bandwidth utilization in a multi-tenant environment. The vPBs may enable CRAN and TAP MEC troubleshooting and packet capturing on demand. By deploying vPBs, network operators may eliminate the need to install probes at all CRAN and TAP locations. As a result, the probe system may enable the network to monitor and improve performance, which may cause the network to conserve processing resources and signaling resources. Network providers may also reduce costs.

FIGS. 1A-1F are diagrams of an example 100 associated with automated remote network performance monitoring. As shown in FIGS. 1A-1F, example 100 includes clusters of base stations (e.g., gNBs), TAPs, and CRANs. Each CRAN may include a network device 110, an MEC device 120, and a vPB 115. Multiple CRANs may be aggregated at a TAP, and TAPs may be aggregated at an SAP. The vPBs 115 may be deployed on COTS devices. Each TAP may also include an MEC device. Example 100 also shows an SAP with a packet broker 125 and a stack of probes 130. The probe system 135 may obtain remote traffic from a large quantity of inexpensive vPBs 115. For example, an optical tap may split some light on a fiber cable and provide a copy of traffic to a vPB 115. The probe system 135 may provide traffic information to the stack of probes 130, which can perform calculations. For example, the vPB 115 may forward a copy of all of the traffic to the probes 130, forward only MEC traffic, or filter traffic for a subnet or customer of interest. The more expensive probes 130 may calculate KPIs, but the probes 130 may have limited capacity. However, the less expensive vPBs 115 may be left on full time or switched to an on-demand model, based on the capacity of the probes 130. For example, if the probes 130 have capacity, the vPBs may be on all the time. If the probes 130 have more limited capacity, the vPBs may operate on demand and/or filter for traffic of interest.

Example 100 further shows a probe system 135, which may include one or more devices that may control the vPBs.

FIG. 1A shows a probe system 135 that determines one or more parameters for filtering network traffic. The probe system 135 may operate with a network that includes a plurality of vPBs provided for a plurality of CRANs and a plurality of TAPs. The parameters may filter network traffic based on VIP addresses, virtual local area network (VLAN), subnets, tuples (e.g., 5-tuples), a subset of traffic of interest, and/or SNMPs of the network traffic. As shown in FIG. 1A, and by reference number 140, probe system 135 may provide the one or more parameters to the vPBs 115, to cause the vPBs 115 to filter the network traffic to obtain network visibility traffic.

The probe system 135 may receive data identifying the vPBs 115, generate a user interface (UI) based on the data, and provide the user interface for display. The vPBs 115 may be accessible via a single graphic UI. An egressing visibility port may timeout and be disabled after 24 hours to eliminate over-subscription of unified transport (UT) links or probe capacity.

As shown by reference number 145, probe system 135 may receive, from one or more probes of an SAP of the network, one or more metrics calculated based on the network visibility traffic by the vPBs 115. The metrics may be associated with an availability, latency, utilization, and/or jitter of a CRAN or a TAP.

As shown by reference number 150, the probe system 135 may determine one or more actions to be implemented based on the metrics. As shown by reference number 155, the probe system 135 may cause the actions to be implemented in the network. In some implementations, the probe system 135 may dispatch a technician to service a network device associated with one of the CRANs or one of the TAPs, dispatch an autonomous vehicle to service a network device associated with a CRAN or a TAP, or order a replacement network device to replace a network device associated with a CRAN or TAP. The probe system 135 may also determine and cause other actions to be implemented in the network.

Figure 1C:
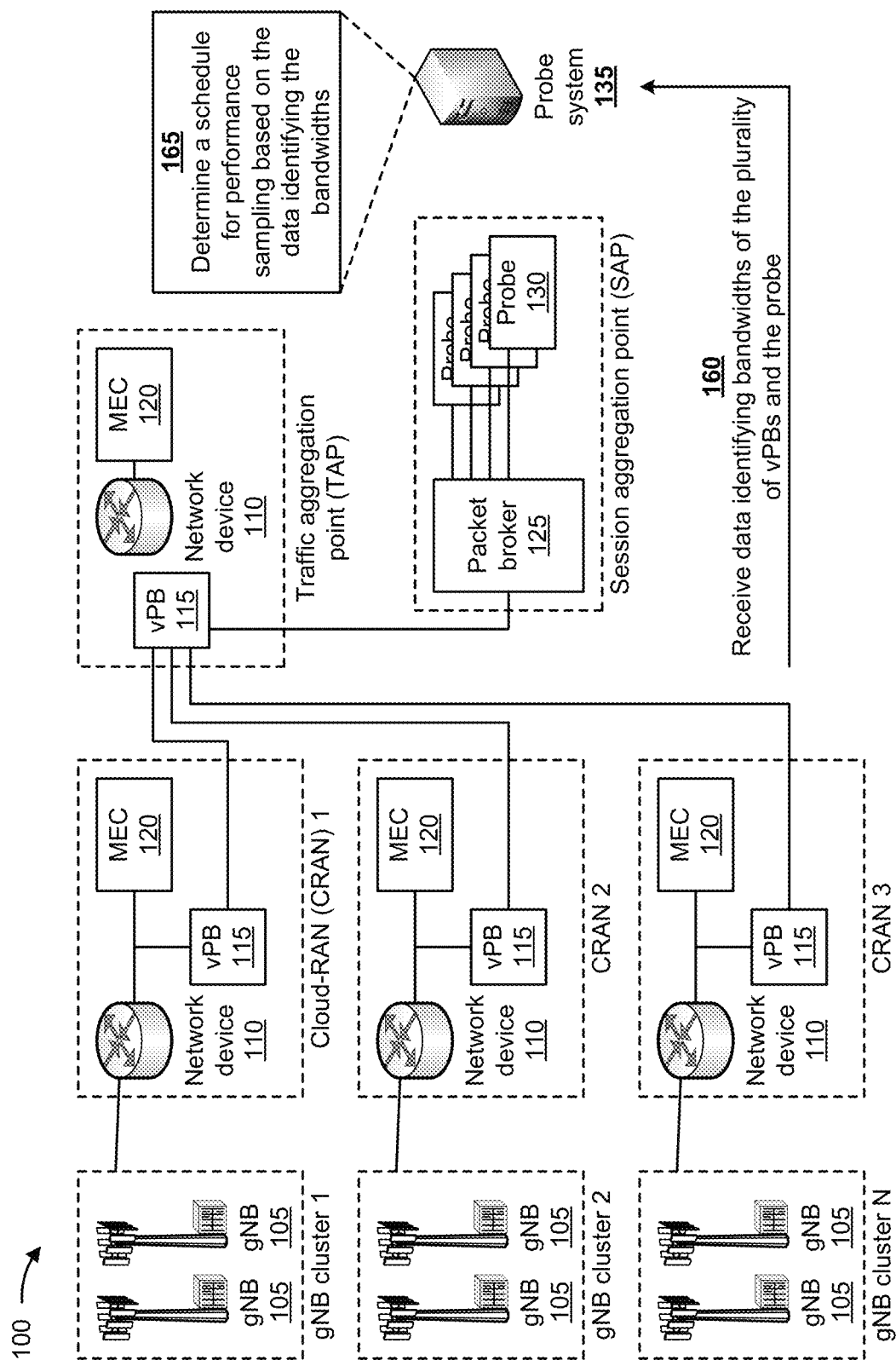

In some implementations, the probe system 135 may configure probes 130 for automated remote performance sampling. The probe system 135 may cycle through (e.g., daily, hourly) performance sampling of CRANs and/or TAPs, based on a capacity of the probes 130. As shown by FIG. 1C, and by reference number 160, the probe system 135 may receive data identifying bandwidths (e.g., available backhaul bandwidths) of the vPBs 115 and the probes 130. As shown by reference number 165, the probe system 165 may determine a schedule for performance sampling based on the data identifying the bandwidths.

Probe capacity may be reserved for on-demand probing, including for multi-tenant environments. Packet broker 125 may cause vPBs 115 to utilize optical taps in CRANs, TAPs, and/or an SAP between backhaul MEC entities and MEC tenants to determine bandwidth utilization. The vPBs may receive copies of traffic (e.g., packets) from the optical tap (which creates copies), determine how to filter the traffic, and then send the filtered traffic to a probe 130 for KPI calculation. This may include full-time SNMP polling of all visibility traffic. The probe system 135 may pass visibility traffic of interest on demand by opening up or throttling an egressing port to a unified transport link. That is, the probe system 135 may turn the vPBs on and off on demand, based on need.

Figure 1D:
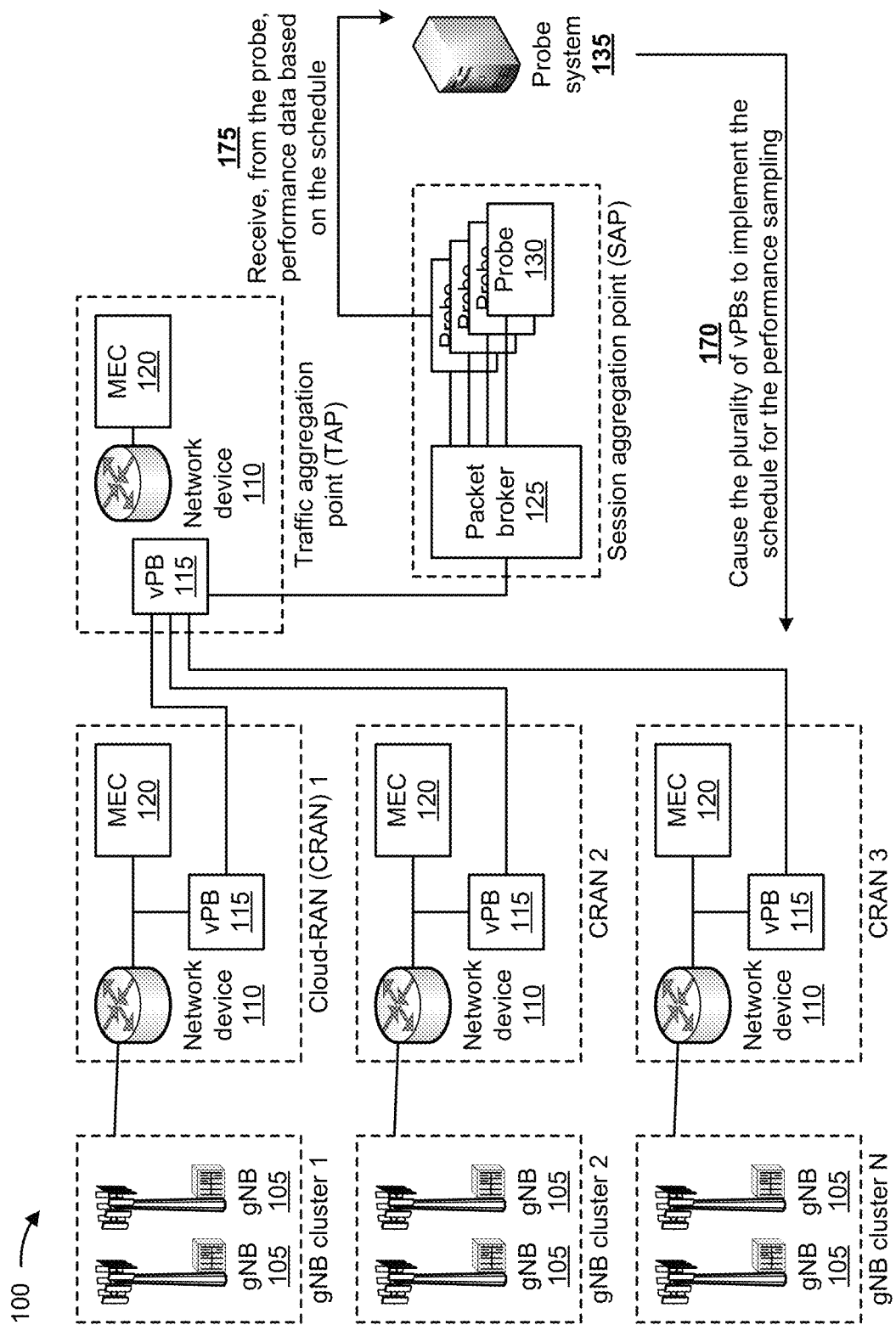

As shown by FIG. 1D, and by reference number 170, the probe system 135 may cause the vPBs 115 to implement the schedule for the performance sampling. For example, some probes 130 may be scheduled for CRAN 1 for 24 hour periods on Monday, Thursday, and Sunday. Some probes 130 may be scheduled for CRAN 2 for 24 hour periods on Tuesday and Friday. Some probes 130 may be scheduled for CRAN 3 for 24 hour periods on Wednesday and Saturday.

As shown by reference number 175, the probe system 135 may receive, from the probes 130, network performance data generated based on the vPBs 115 implementing the schedule for the performance sampling. Network performance data may be received only during scheduled time frames.

Figure 1E:
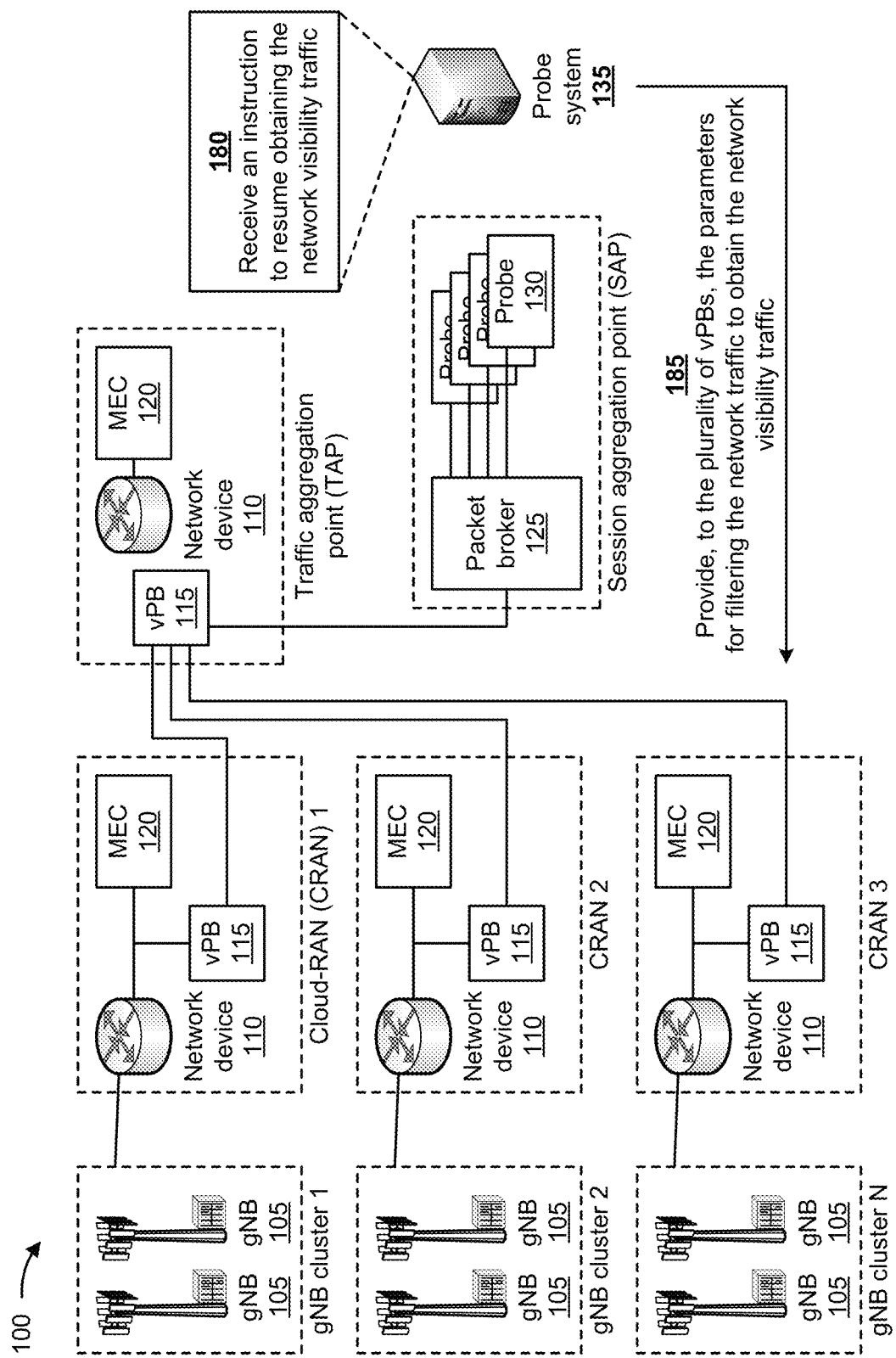
Figure 1F:
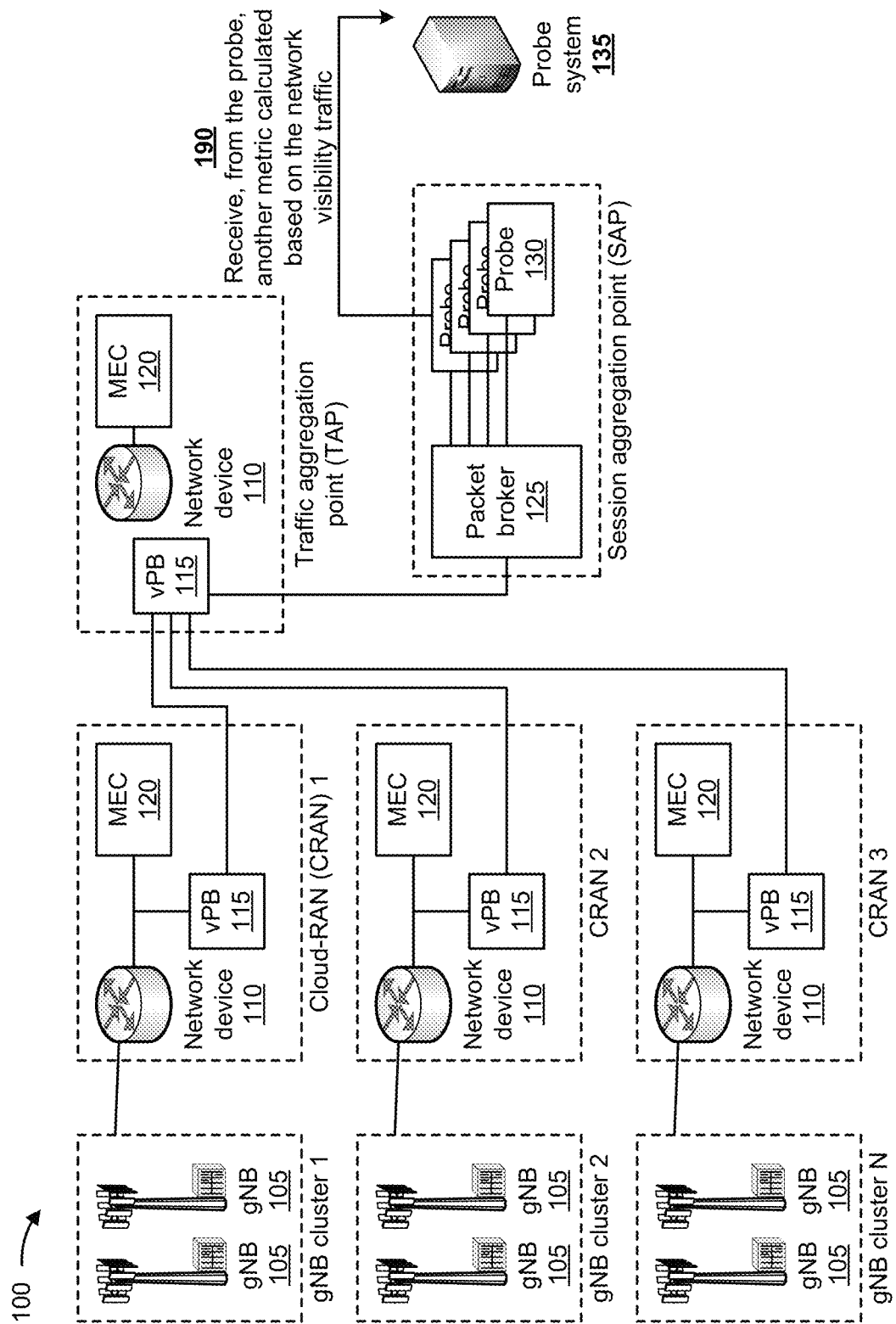

In some implementations, the probe system 135 may use the vPBs 115 to obtain network visibility traffic. As shown in FIG. 1E, and by reference number 180, the probe system 135 may receive an instruction to resume obtaining the network visibility traffic. As shown by reference number 185, the probe system 135 may provide, to the vPBs 115 and based on the instruction, the parameters for filtering the network traffic to the network visibility traffic. As shown by FIG. 1F, and by reference number 190, the probe system 135 may receive, from the one or more probes, one or more additional metrics calculated based on the network visibility traffic by the vPBs 115. The probe system may determine one or more additional actions to be implemented based on the one or more additional metrics and cause the one or more additional actions to be implemented in the network.

In some implementations, the prove system 135 may provide parameters that cause a first set of the vPBs 115 to not capture the network traffic, and cause a second set of the vPBs 115 to capture the network traffic, filter the network traffic to the network visibility traffic, and provide the network visibility traffic to the probes 130.

Figure 2:
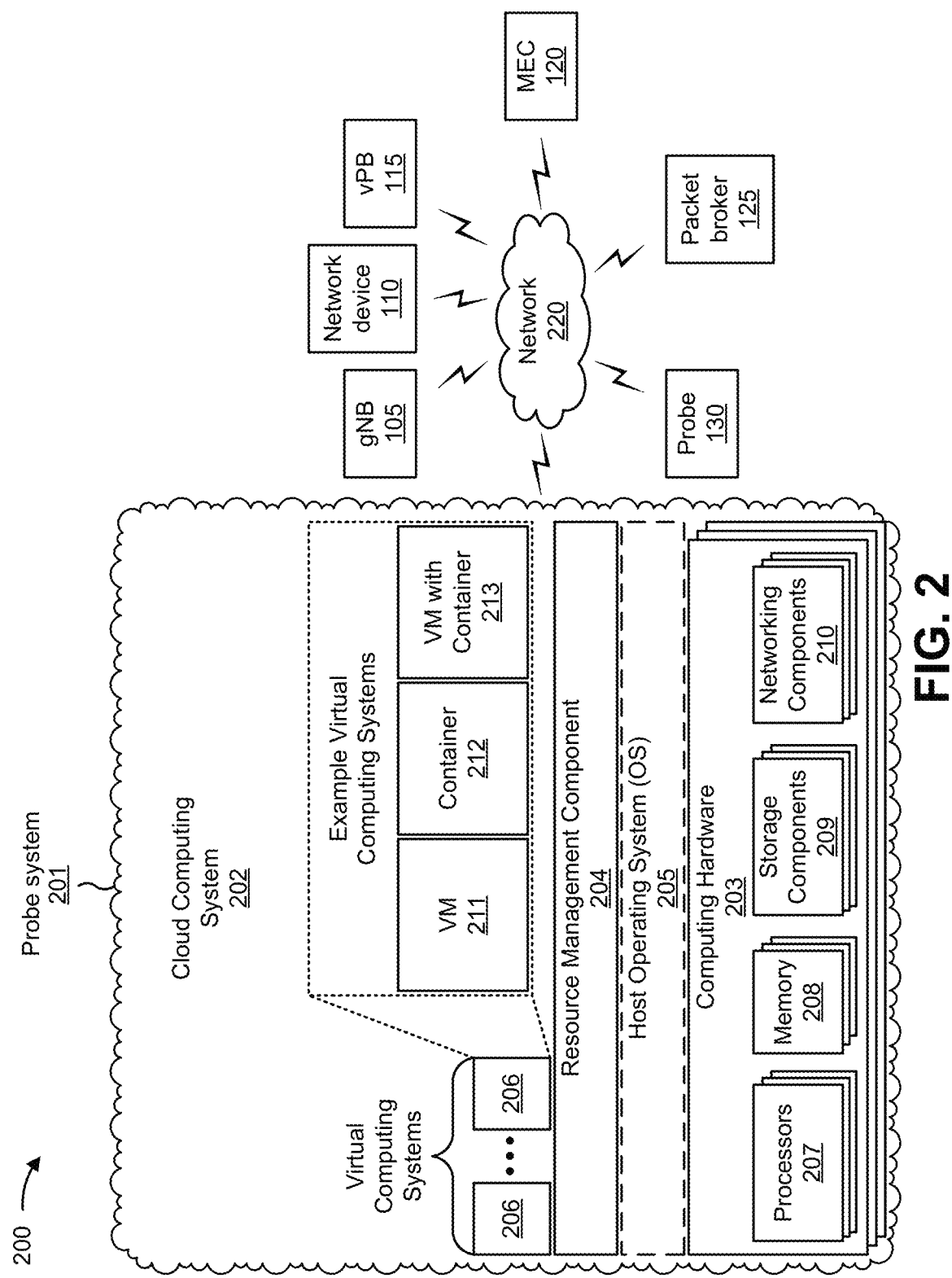
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a probe system 201, which may include one or more elements of and/or may execute within a cloud computing system 202. The cloud computing system 202 may include one or more elements 203-213, as described in more detail below. As further shown in FIG. 2, environment 200 may include a probe system 201, a cloud computing system 202, a network 220, one or more gNBs 105, one or more network devices 110, one or more vPBs 15, one or more MECs 120, multiple probes 130, and a packet broker 125. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/ or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the probe system 201 may include one or more elements 203-213 of the cloud computing system 202, may execute within the cloud computing system 202, and/or may be hosted within the cloud computing system 202, in some implementations, the probe system 201 may not be cloud-based (e.g., may be implemented outside of a cloud computing system) or may be partially cloud-based. For example, the probe system 201 may include one or more devices that are not part of the cloud computing system 202, such as device 300 of FIG. 3, which may include a stand-alone server or another type of computing device. The probe system 201 may perform one or more operations and/or processes described in more detail elsewhere herein, such as for probe system 135.

Network 220 includes one or more wired and/or wireless networks. For example, network 220 may include a cellular network, a public land mobile network (PLMN), a local area network (LAN), a wide area network (WAN), a private network, the Internet, and/or the like, and/or a combination of these or other types of networks. The network 220 enables communication among the devices of environment 200. The network device 110 may be a network entity in a CRAN that handles functionality for the CRAN, including for a vPB and/or an MEC 120. The MEC 120 may facilitate moving computing of traffic and services from cloud computing system 202 closer to an edge of the network 220. The packet broker 125 may help to provide network packet data to the probe system 135 for analysis.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
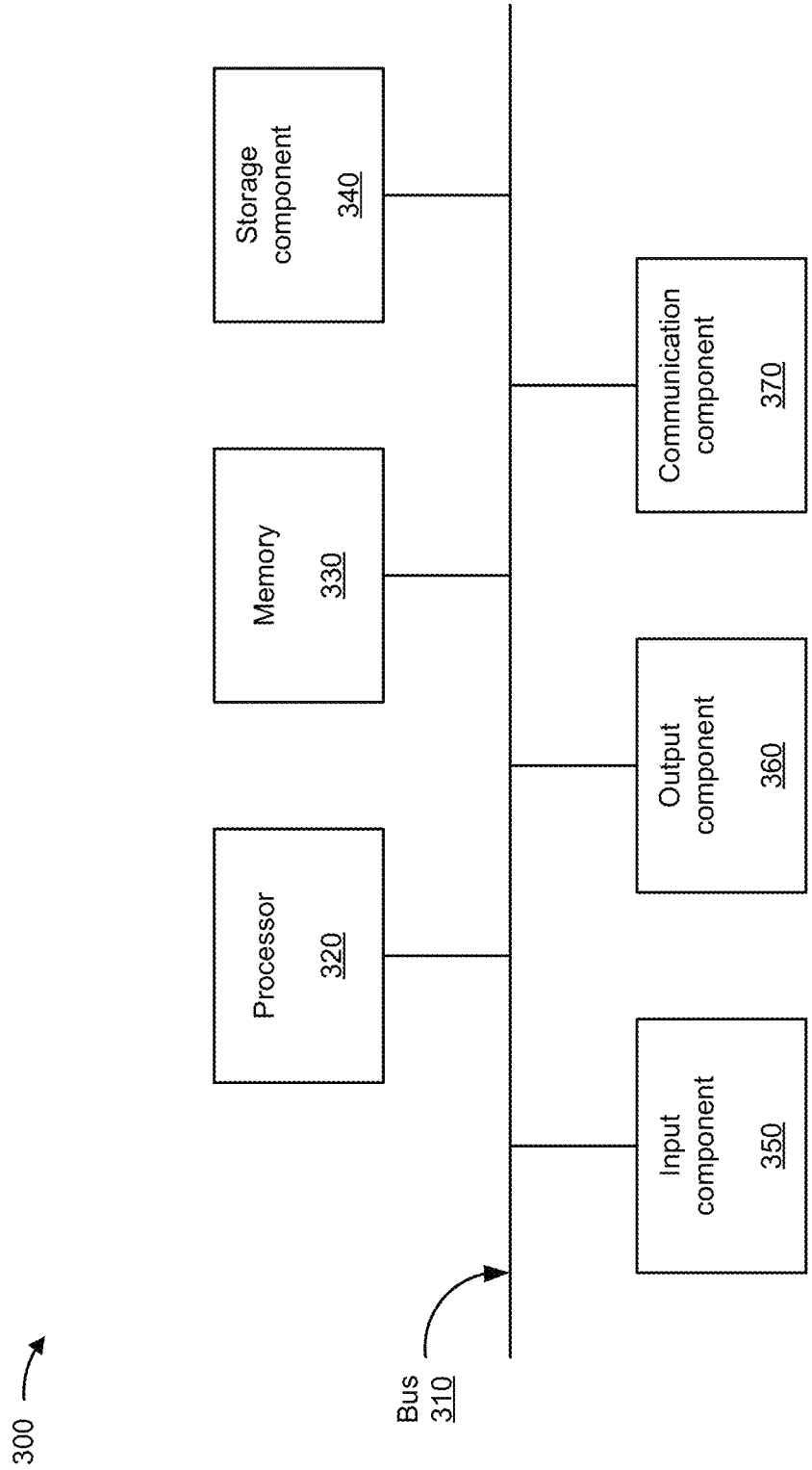
FIG. 3 is a diagram of example components of one or more devices of FIG. 2.

FIG. 3 is a diagram of example components of a device 300, which may correspond to probe system 201. In some implementations, probe system 201 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
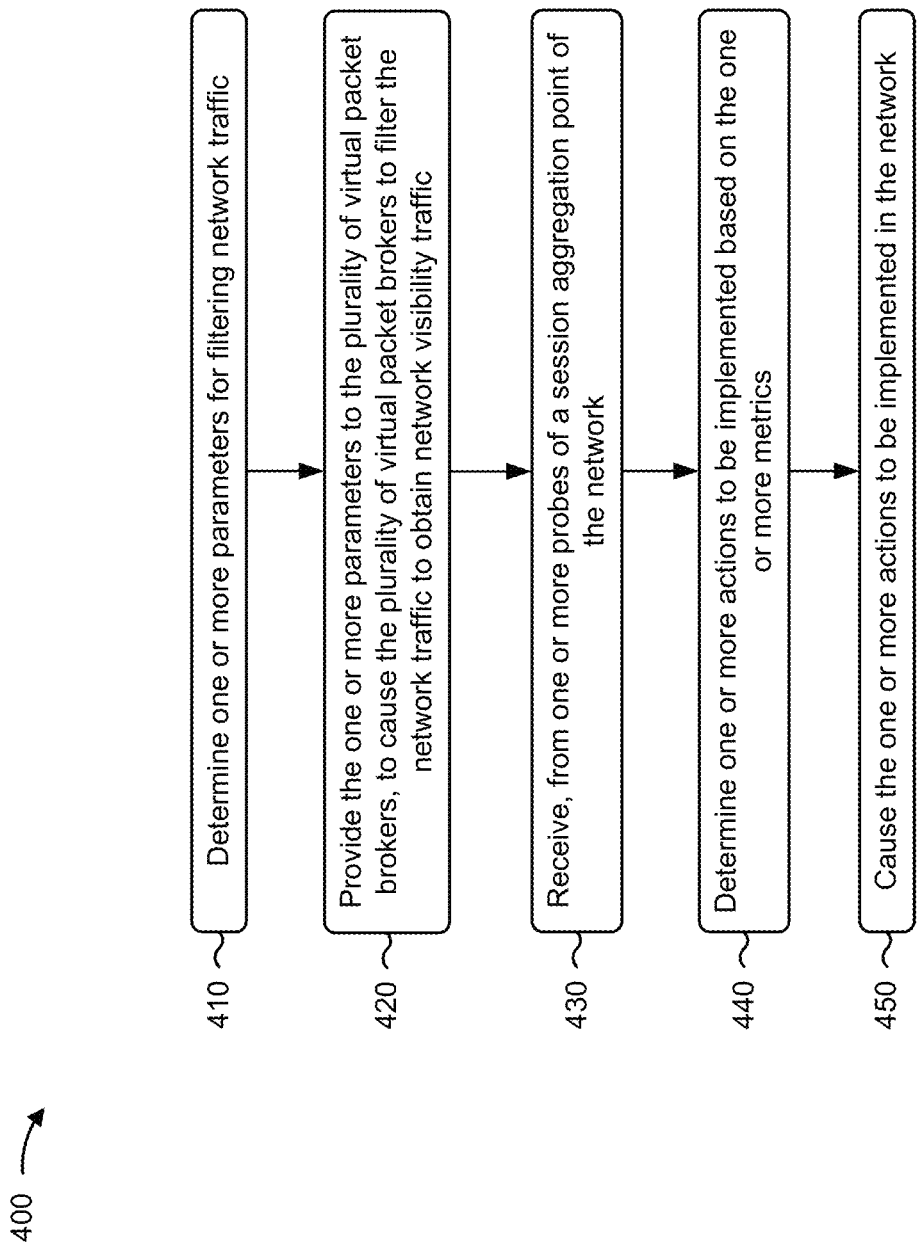
FIG. 4 is a flowchart of an example process relating to automated remote network performance monitoring.

FIG. 4 is a flowchart of an example process 400 associated with systems and methods for automated remote network performance monitoring. In some implementations, one or more process blocks of FIG. 4 may be performed by a device (e.g., device of probe system 135, device of probe system 201). In some implementations, one or more process blocks of FIG. 4 may be performed by another device or a group of devices separate from or including the device, such as MEC 120, network device 110, packet broker 125, and/or gNB 105. Additionally, or alternatively, one or more process blocks of FIG. 4 may be performed by one or more components of device 300, such as processor 320, memory 330, storage component 340, input component 350, output component 360, and/or communication component 370.

A network may include a plurality of virtual packet brokers. The virtual packet brokers may be provided for a plurality of cloud random access networks and a plurality of traffic aggregation points. As shown in FIG. 4, process 400 may include determining one or more parameters for filtering network traffic of the network (block 410). For example, the device may determine one or more parameters for filtering network traffic, of a network that includes a plurality of virtual packet brokers provided for a plurality of cloud random access networks and a plurality of traffic aggregation points, as described above. In some implementations, each of the plurality of virtual packet brokers is deployed on a commercial off-the-shelf device.

As further shown in FIG. 4, process 400 may include providing the one or more parameters to the plurality of virtual packet brokers, to cause the plurality of virtual packet brokers to filter the network traffic to obtain network visibility traffic (block 420). For example, the device may provide the one or more parameters to the plurality of virtual packet brokers, to cause the plurality of virtual packet brokers to filter the network traffic to obtain network visibility traffic, as described above.

As further shown in FIG. 4, process 400 may include receiving, from one or more probes of a session aggregation point of the network, one or more metrics calculated based on the network visibility traffic by the plurality of virtual packet brokers (block 430). For example, the device may receive, from one or more probes of a session aggregation point of the network, one or more metrics calculated based on the network visibility traffic by the plurality of virtual packet brokers, as described above. In some implementations, the one or more metrics include one or more of a metric associated with an availability of one of the plurality of cloud random access networks or one of the plurality of traffic aggregation points, a metric associated with a latency of one of the plurality of cloud random access networks or one of the plurality of traffic aggregation points, a metric associated with utilization of one of the plurality of cloud random access networks or one of the plurality of traffic aggregation points, or a metric associated with jitter of one of the plurality of cloud random access networks or one of the plurality of traffic aggregation points.

In some implementations, process 400 includes receiving data identifying bandwidths of the plurality of virtual packet brokers and the one or more probes, determining a schedule for performance sampling based on the data identifying the bandwidths, causing the plurality of virtual packet brokers to implement the schedule for the performance sampling, and receiving, from the one or more probes, network performance data generated based on the plurality of virtual packet brokers implementing the schedule for the performance sampling.

As further shown in FIG. 4, process 400 may include determining one or more actions to be implemented based on the one or more metrics (block 440). For example, the device may determine one or more actions to be implemented based on the one or more metrics, as described above.

In some implementations, process 400 includes receiving an instruction to resume obtaining the network visibility traffic, providing, to the plurality of virtual packet brokers and based on the instruction, the one or more parameters for filtering the network traffic to the network visibility traffic, receiving, from the one or more probes, one or more additional metrics calculated based on the network visibility traffic by the plurality of virtual packet brokers, determining one or more additional actions to be implemented based on the one or more additional metrics, and causing the one or more additional actions to be implemented in the network.

As further shown in FIG. 4, process 400 may include causing the one or more actions to be implemented in the network (block 450). For example, the device may cause the one or more actions to be implemented in the network, as described above. In some implementations, process 400 includes determining one or more additional actions to be implemented based on the network performance data, and causing the one or more additional actions to be implemented in the network.

In some implementations, causing the one or more actions to be implemented comprises one or more of dispatching a technician to service a network device associated with one of the plurality of cloud random access networks or one of the plurality of traffic aggregation points, dispatching an autonomous vehicle to service a network device associated with one of the plurality of cloud random access networks or one of the plurality of traffic aggregation points, or ordering a replacement network device to replace a network device associated with one of the plurality of cloud random access networks or one of the plurality of traffic aggregation points.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

By using probe system 135, a centralized cloud platform may receive vPB bandwidth and probe bandwidth, and determine when to turn the vPBs on and off to focus on specific traffic. Deploying the vPBs and probes as described above renders great cost savings and conserves processing and signaling resources.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    providing, by a device, one or more parameters to a plurality of virtual packet brokers,
        wherein the plurality of virtual packet brokers is deployed in a plurality of cloud random access networks and a plurality of traffic aggregation points, and
        wherein the plurality of virtual packet brokers filter network traffic to obtain network visibility traffic and pass the network visibility traffic to one or more probes;
    receiving, by the device and from the one or more probes, one or more metrics based on the network visibility traffic obtained by the plurality of virtual packet brokers;
    causing, by the device, one or more actions to be implemented in a network based on the one or more metrics, wherein causing the one or more actions to be implemented comprises:
        configuring the one or more probes for automated remote performance sampling;
    receiving, by the device, data identifying bandwidths of the plurality of virtual packet brokers and the one or more probes,
        wherein the plurality of virtual packet brokers utilize simple network management protocol (SNMP) to determine bandwidth utilization in the plurality of cloud random access networks and the plurality of traffic aggregation points;
    causing, by the device, the plurality of virtual packet brokers to implement a schedule for performance sampling based on the data identifying the bandwidths; and
    receiving, by the device, from the one or more probes and based on the plurality of virtual packet brokers implementing the schedule, network performance data to determine when to turn on or off one or more of the plurality of virtual packet brokers.

2. The method of claim 1, wherein the one or more metrics include availability, latency, or utilization of a cloud random access network or a traffic aggregation point.

3. The method of claim 1, further comprising:
    receiving an instruction to resume obtaining the network visibility traffic;
    providing, to the plurality of virtual packet brokers and based on the instruction, the one or more parameters for filtering the network traffic;
    receiving, from the one or more probes, one or more additional metrics calculated based on the network visibility traffic by the plurality of virtual packet brokers;
    determining one or more additional actions to be implemented based on the one or more additional metrics; and
    causing the one or more additional actions to be implemented in the network.

4. The method of claim 1, wherein causing the plurality of virtual packet brokers to implement the schedule for performance sampling comprises:
    configuring the one or more probes for remote automated remote performance sampling,
        wherein the device cycles through daily or hourly performance sampling of one or more of cloud random access networks or traffic aggregation points based on a capacity of the probes.

5. The method of claim 1, wherein a virtual packet broker, of the plurality of virtual packet brokers, is deployed on a commercial off-the-shelf device.

6. The method of claim 1, further comprising:
    determining the one or more parameters,
        wherein the one or more parameters include one or more of:
            a parameter for filtering the network traffic based on virtual Internet protocol addresses of the network traffic,
            a parameter for filtering the network traffic based on subnets of the network traffic,
            a parameter for filtering the network traffic based on tuples of the network traffic, or a parameter for filtering the network traffic based on a simple network management protocol.

7. The method of claim 1, wherein the one or more parameters cause a first set of the plurality of virtual packet brokers to not capture the network traffic, and cause a second set of the plurality of virtual packet brokers to capture the network traffic.

8. A device, comprising:
one or more processors configured to:
determine one or more parameters for filtering network traffic, of a network that includes a plurality of virtual packet brokers deployed in a plurality of cloud random access networks and a plurality of traffic aggregation points;
provide the one or more parameters to the plurality of virtual packet brokers,
wherein the plurality of virtual packet brokers filter the network traffic to obtain network visibility traffic and pass the network visibility traffic to one or more probes;
receive, from the one or more probes, one or more metrics based on the network visibility traffic obtained by the plurality of virtual packet brokers;
cause one or more actions to be implemented in a network based on the one or more metrics,
wherein the one or more processors to cause the one or more actions to be implemented are to:
configure the one or more probes for automated remote performance sampling;
receive data identifying bandwidths of the plurality of virtual packet brokers and the one or more probes,
wherein the plurality of virtual packet brokers utilize simple network management protocol (SNMP) to determine bandwidth utilization in the plurality of cloud random access networks and the plurality of traffic aggregation points;
cause the plurality of virtual packet brokers to implement a schedule for performance sampling based on the data identifying the bandwidths; and
receive, from the one or more probes and based on the plurality of virtual packet brokers implementing the schedule for the performance sampling, network performance data.

9. The device of claim 8, wherein the plurality of cloud random access networks and the plurality of traffic aggregation points include a mobile edge computing device.

10. The device of claim 8, wherein the one or more parameters include one or more of:
a parameter for filtering the network traffic based on virtual Internet protocol addresses of the network traffic, or
a parameter for filtering the network traffic based on subnets of the network traffic.

11. The device of claim 8, wherein the one or more processors are further configured to:
receive data identifying the plurality of virtual packet brokers and the one or more probes;
generate a user interface based on the data identifying the plurality of virtual packet brokers and the one or more probes; and
provide the user interface for display.

12. The device of claim 8, wherein the one or more processors are further configured to:
determine the one or more parameters,
wherein the one or more parameters include one or more of:
a parameter for filtering the network traffic based on tuples of the network traffic, or
a parameter for filtering the network traffic based on a simple network management protocol.

13. The device of claim 8, wherein the one or more parameters cause a first set of the plurality of virtual packet brokers to not capture the network traffic, and cause a second set of the plurality of virtual packet brokers to capture the network traffic, filter the network traffic to the network visibility traffic, and provide the network visibility traffic to the one or more probes.

14. The device of claim 8, wherein the one or more processors are further configured to:
receive, from the one or more probes, one or more additional metrics calculated based on the network visibility traffic by the plurality of virtual packet brokers;
determine one or more additional actions to be implemented based on the one or more additional metrics; and
cause the one or more additional actions to be implemented in the network.

15. A non-transitory computer-readable medium storing a set of instructions, the set of instructions comprising:
one or more instructions that, when executed by one or more processors of a device, cause the device to:
provide one or more parameters to a plurality of virtual packet brokers,
wherein the plurality of virtual packet brokers filter network traffic to obtain network visibility traffic and pass the network visibility traffic to one or more probes, and
wherein the plurality of virtual packet brokers is deployed in a plurality of cloud random access networks and a plurality of traffic aggregation points;
receive, from the one or more probes, one or more metrics based on the network visibility traffic obtained by the plurality of virtual packet brokers;
cause one or more actions to be implemented in a network based on the one or more metrics,
wherein the one or more instructions that cause the device to cause one or more actions to be implemented, cause the device to:
configure the one or more proves for automated remote performance sampling;
receive data identifying bandwidths of the plurality of virtual packet brokers and the one or more probes,
wherein the plurality of virtual packet brokers utilize time simple network management protocol (SNMP) to determine bandwidth utilization in the plurality of cloud random access networks and the plurality of traffic aggregation points; and
receive, from the one or more probes, network performance data based on the plurality of virtual packet brokers implementing a schedule for performance sampling based on the data identifying the bandwidths.

16. The non-transitory computer-readable medium of claim 15, wherein the one or more metrics include availability, latency, or utilization of one of the plurality of cloud random access networks or one of the plurality of traffic aggregation points.

17. The non-transitory computer-readable medium of claim 15, wherein the one or more instructions further cause the device to one or more of:

dispatch an autonomous vehicle to service a network device associated with one of the plurality of cloud random access networks or one of the plurality of traffic aggregation points; or order a replacement network device to replace a network device associated with one of the plurality of cloud random access networks or one of the plurality of traffic aggregation points.

18. The non-transitory computer-readable medium of claim 15, wherein the network performance data is only received during scheduled times based on the schedule for performance sampling.

19. The non-transitory computer-readable medium of claim 15, wherein the one or more parameters cause a first set of the plurality of virtual packet brokers to not capture the network traffic, and cause a second set of the plurality of virtual packet brokers to capture the network traffic, filter the network traffic to the network visibility traffic, and provide the network visibility traffic to the one or more probes.

20. The non-transitory computer-readable medium of claim 15, wherein the plurality of virtual packet brokers are configured to be turned on and off based on need.

* * * * *